Oct. 17, 1967  A. M. LUECK  3,347,651
METHOD FOR FORMING A LENS ON A METAL RING
Filed March 28, 1963

Arthur M. Lueck
INVENTOR

United States Patent Office 3,347,651
Patented Oct. 17, 1967

3,347,651
METHOD FOR FORMING A LENS ON A METAL RING
Arthur M. Lueck, Dallas, Tex., assignor to Texas Instruments Incorporated, Dallas, Tex., a corporation of Delaware
Filed Mar. 28, 1963, Ser. No. 268,626
2 Claims. (Cl. 65—39)

This invention relates to optical lenses and more particularly to a method of making lenses for use with light sensing devices.

In the manufacture of light sensing devices, a small lens is used as a window for the transmission of light to the light-sensitive element of the device. Lenses for such purposes are presently made in several ways. They are made, for example, by heating the end of a glass tube with a flame to form a plano convex lens thereon; or by pouring molten glass in a polished mold; or by grinding or polishing from a glass disc; or by extruding molten glass through an orifice to form a dome above the orifice.

Each of the above methods of lens production, besides being costly, has other disadvantages. Thus the flame method results in a nonuniform lens having gas bubbles entrapped therein; the molding method, even with polished molds, requires costly polishing, as does the glass disc method, while the extrusion method leaves rough surfaces where the glass was in contact with the extrusion plunger. Moreover, none of the lenses produced by any of the above methods can be soldered, brazed or welded in place. However, for protection and long life of the light sensing device, it is necessary that the lenses be hermetically sealed to the package housing the device.

It is then an object of the invention to provide a method of making a lens which is simple and inexpensive to carry out.

It is another object to provide a lens device in which the lens is hermetically sealed to the device.

Other objects and features of the invention will be apparent from the following detailed description, taken in conjunction with the appended claims and the attached drawings in which:

Figure 1:
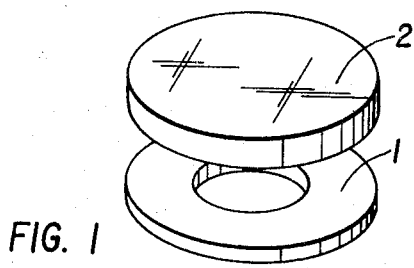
FIGURE 1 shows a glass disc and metal ring which may be used in forming a lens.
Figure 2:
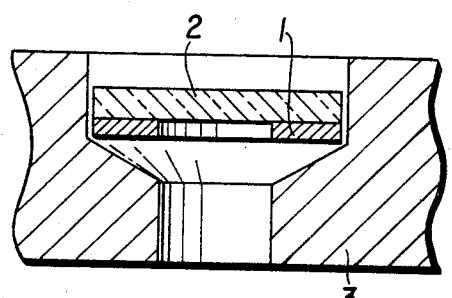
FIGURE 2 shows the glass disc and metal ring positioned in a graphite boat for firing.
Figure 5:
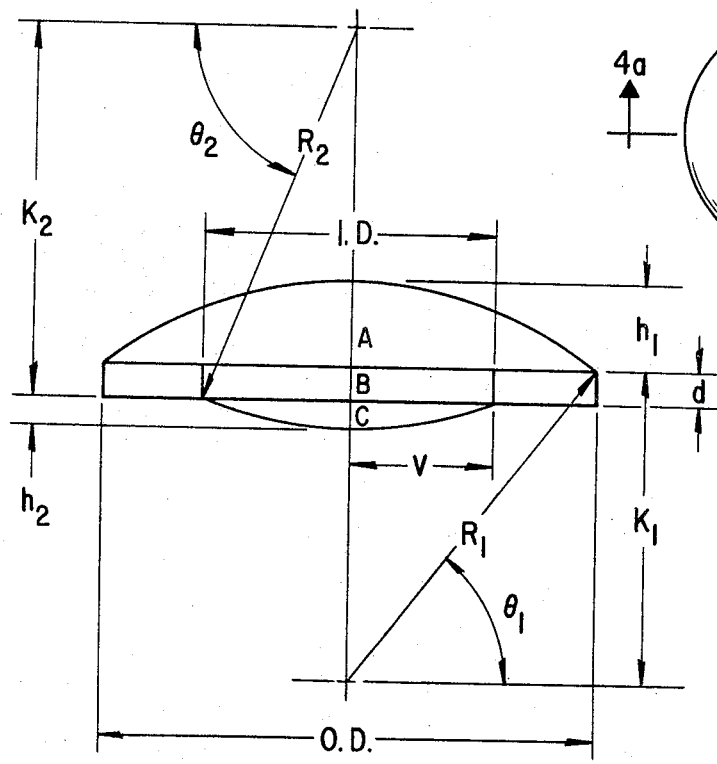
FIGURE 5 is an optical diagram by the aid of which the volume of glass required for a particular lens is calculated.

The lens forming technique described herein uses the surface tension of the molten glass and the ability of the glass to wet metal oxide in forming the lens. Referring now to FIGURES 1 and 2, a flat glass disc 2 and an oxidized KOVAR ring 1, approximately .005" thick, for example, and shown by the dimension $d$ in FIGURE 5, are superimposed with the ring on the bottom and placed together in a graphite boat 3. The glass may be any borosilicate glass such as Corning 7052 which is composed approximately as follows: $SiO_2$, 80%; $BiO_3$, 14%; $Na_2O$, 4%, and $Al_2O_3$, 2%. Kovar is a trade name for a nickel-iron-cobalt alloy. The boat 3 centers the glass on the metal ring and prevents the glass from touching any foreign material while molten. The boat is placed in an inert atmosphere at about 900° C. for about five minutes. The time and temperature may be varied in order to produce the desired shape of the lens.

Figure 3A:
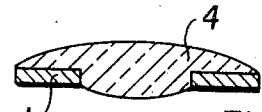
FIGURES 3a and 3b show one form of a finished lens.
Figure 3B:
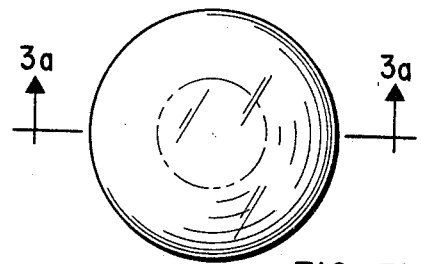
Figure 4A:
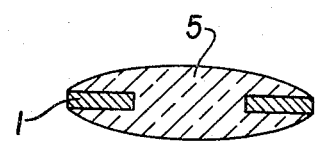
FIGURES 4a and 4b show another form of a finished lens.
Figure 4B:
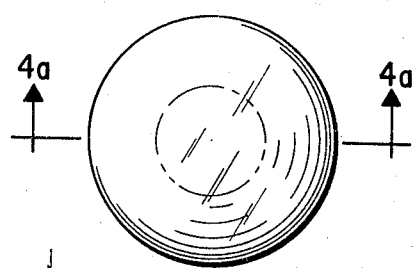

The actual forming of the lens results from certain properties of the molten glass. As the glass is heated, its viscosity decreases and its surface energy changes in a manner so that the surface tension tends to reduce the surface area of the glass by forming a sphere. At the same time, the interfacial energy between the glass and the underlying metallic oxide of the Kovar ring decreases and the glass begins to dissolve a small amount of the oxide. The dissolution process allows the glass to wet the oxide surface and to spread in all directions around the periphery of the molten glass-oxide interface, the section formed being spherical. Since the underlying metal or rigid substrate is a ring, as indicated, the same process occurs at the bottom of the glass and another spherical segment is formed. In wetting the oxide surface of the ring, the glass adheres to the ring, forming a bond between the glass and the metal ring. The resulting combination of lens and ring thus provides a lens that may be attached by soldering, brazing or welding the ring to a device package forming a hermetic seal therewith. In the above described process, a double convex lens 4 is formed (FIGURE 3). If the wetting process is allowed to continue, the glass will eventually wet both sides of the ring and a highly symmetrical lens 5 is formed, as shown in FIGURE 4a. The lens 5 may be desirable for some applications, but for use in light sensing devices the lens 4 is more desirable since the metal ring 1 may be bonded to the rest of the device enclosure. Although a round glass disc has been shown, any configuration containing the proper volume of glass will suffice as shown below. In applications where the metal ring is not needed, the ring may be etched away from the glass.

The lens characteristic may be calculated from the diameter of the lens, the desired focal length, and the index of refraction of the glass. By way of example, consider a lens with .060" O.D., a .030 I.D. (ring), and a desired focal length of .048". By assuming that the thin lens theory will closely approximate the conditions for proper characteristics, and that the radius of curvature for both sides of the lens are equal; then referring to FIGURE 5;

$$\frac{1}{f}=(n-1)\left(\frac{1}{R_1}-\frac{1}{R_2}\right)$$

where:

$f$=focal length
$n$=index of refraction (1.6 for borosilicate glass)
$R_1,R_2$=radius of curvature for lens surfaces since $R_1=R_2$, then $2f(n-1)=.058"$.

Now from FIGURE 5:

$K_1=58\times10^{-3}\sin\theta_1=49.5\times10^{-3}$
$h_1=58\times10^{-3}-49.5\times10^{-3}=8.5\times10^{-3}$
$K_2=58\times10^{-3}\sin\theta_2=55.9\times10^{-3}$
$h_2=58\times10^{-3}-55.9\times10^{-3}=2.1\times10^{-3}$ Volume $A=\frac{1}{3}\pi h_1^2(3R_1-h_1)=1.25\times10^{-5}$ in.$^3$
Volume $B=d\pi r^2=.354\times10^{-5}$ in.$^3$
Volume $C=\frac{1}{3}\pi h_2^2(3R_1-h_2)=.080\times10^{-5}$ in.$^3$ Total volume $=1.68\times10^{-5}$ in.$^3=V_t$ Where:

$V_t$=total volume of glass needed
$r$=radius of glass disc of volume B.

Lenses 60–100 mils in diameter have been made as above described. They require no polishing and are easily bonded to other metals or metallized ceramics or, after the metal ring has been chemically removed, may be used in other optical applications.

Although the invention has been described with reference to a specific embodiment, it will be apparent that certain modifications and substitutions will fall within the scope of the invention as defined by the appended claims.

What is claimed is:

1. A method of making a lens device of the type utilized for light-sensitive electronic components comprising the steps of providing a generally flat circular metal member having a central circular opening therein, the member being composed of a nickel-iron-cobalt glass-sealing metal alloy which is oxidized, placing a body of borosilicate glass on one side of said member, melting said glass while the assembly of the glass body and the metal member is maintained in a structure which prevents the molten glass from contacting material other than said member, the glass being maintained in a molten state only long enough to permit a portion of the glass to flow through said opening to form a convex lens on the opposite side of said member but not to flow laterally along said opposite side away from the opening, the remainder of the glass forming a convex lens on said one side of the member.

2. The method of claim 1 wherein said glass is melted by heating said glass and said member in an inert atmosphere to a temperature between 890° to 900° C. for a period between four to six minutes.

References Cited

UNITED STATES PATENTS

| | | | |
|---|---|---|---|
| 1,466,973 | 9/1923 | Takanashi. | |
| 1,539,830 | 6/1925 | Culver | 88—57 |
| 2,219,573 | 10/1940 | Fraenckel | 65—43 |
| 2,648,070 | 7/1953 | Litton | 65—43 |
| 2,874,610 | 2/1959 | Wright | 88—57 |

DONALL H. SYLVESTER, *Primary Examiner.*

F. W. MIGA, *Assistant Examiner.*